US008620299B2

(12) United States Patent
Kumar

(10) Patent No.: US 8,620,299 B2
(45) Date of Patent: Dec. 31, 2013

(54) METHODS, SYSTEMS AND COMPUTER READABLE MEDIA FOR ELECTRONICALLY DELIVERING A PREPAID CARD TO A MOBILE DEVICE

(75) Inventor: Pradeep Kumar, Fremont, CA (US)

(73) Assignee: Mastercard International Incorporated, Purchase, NY (US)

( * ) Notice: Subject to any disclaimer, the term of this patent is extended or adjusted under 35 U.S.C. 154(b) by 614 days.

(21) Appl. No.: 12/190,564

(22) Filed: Aug. 12, 2008

(65) Prior Publication Data

US 2010/0041368 A1 Feb. 18, 2010

(51) Int. Cl.
*H04M 15/00* (2006.01)
*G06F 17/00* (2006.01)

(52) U.S. Cl.
USPC ............. 455/419; 379/114.01; 707/769

(58) Field of Classification Search
USPC ............. 455/405–407, 414.1; 379/114
See application file for complete search history.

(56) References Cited

U.S. PATENT DOCUMENTS

| 5,884,271 | A | 3/1999 | Pitroda |
| 6,592,044 | B1 | 7/2003 | Wong et al. |
| 6,793,135 | B1 | 9/2004 | Ryoo |
| 7,031,693 | B2 | 4/2006 | Öhrström et al. |
| 7,103,572 | B1 * | 9/2006 | Kawaguchi et al. ............ 705/40 |
| 7,127,236 | B2 | 10/2006 | Khan et al. |
| 7,209,733 | B2 | 4/2007 | Ortiz et al. |
| 7,308,254 | B1 | 12/2007 | Rissanen |
| 7,469,151 | B2 | 12/2008 | Khan et al. |
| 7,783,532 | B2 | 8/2010 | Hsu et al. |
| 7,942,337 | B2 | 5/2011 | Jain |
| 7,954,717 | B2 | 6/2011 | Narendra et al. |
| 8,165,635 | B2 | 4/2012 | Khan et al. |
| 2002/0091569 | A1 | 7/2002 | Kitaura et al. |
| 2002/0161640 | A1 | 10/2002 | Wolfe |
| 2003/0004808 | A1 | 1/2003 | Elhaoussine et al. |
| 2003/0101246 | A1 | 5/2003 | Lahti |
| 2003/0199265 | A1 | 10/2003 | Aoyama et al. |
| 2004/0029569 | A1 | 2/2004 | Khan et al. |
| 2004/0054591 | A1 | 3/2004 | Spaeth et al. |
| 2004/0131185 | A1 | 7/2004 | Kakumer |

(Continued)

FOREIGN PATENT DOCUMENTS

| CA | 2 546 911 A1 | 11/2007 |
| CN | 200780040617.4 | 11/2012 |

(Continued)

OTHER PUBLICATIONS 1615-30 PCT-MX—FA Instructions for Second OA.*

(Continued)

*Primary Examiner* — Nizar Sivji
(74) *Attorney, Agent, or Firm* — Jenkins, Wilson, Taylor & Hunt, P.A.

(57) ABSTRACT

Methods, systems, and computer readable media for electronically delivering a prepaid card to a mobile device are disclosed. According to one aspect, the method includes receiving, at a merchant server, purchase information related to the purchase of an electronic prepaid card. The method further includes receiving, from the merchant server, electronic prepaid card information derived from the purchase information. The method further includes establishing a communications link with a mobile device associated with address data included in the electronic prepaid card information. The method also includes provisioning the electronic prepaid card information on the mobile device via over the air (OTA) communications.

19 Claims, 4 Drawing Sheets

(56) References Cited

U.S. PATENT DOCUMENTS

| | | | |
|---|---|---|---|
| 2004/0181463 A1 | 9/2004 | Goldthwaite et al. | |
| 2005/0070257 A1 | 3/2005 | Saarinen et al. | |
| 2006/0023856 A1* | 2/2006 | Welton | 379/114.2 |
| 2006/0080111 A1 | 4/2006 | Homeier-Beals | |
| 2006/0163343 A1 | 7/2006 | Changryeol | |
| 2006/0165060 A1 | 7/2006 | Dua | |
| 2006/0236325 A1 | 10/2006 | Rao et al. | |
| 2006/0282319 A1 | 12/2006 | Maggio | |
| 2007/0016479 A1 | 1/2007 | Lauper | |
| 2007/0042756 A1 | 2/2007 | Perfetto et al. | |
| 2007/0050871 A1 | 3/2007 | Mashhour | |
| 2007/0099599 A1 | 5/2007 | Smith et al. | |
| 2007/0152829 A1 | 7/2007 | Lindsay et al. | |
| 2007/0174116 A1 | 7/2007 | Keith et al. | |
| 2007/0198339 A1 | 8/2007 | Shen et al. | |
| 2007/0224979 A1 | 9/2007 | O'Neal et al. | |
| 2007/0241183 A1 | 10/2007 | Brown et al. | |
| 2007/0255662 A1 | 11/2007 | Tumminaro | |
| 2008/0040354 A1 | 2/2008 | Ray et al. | |
| 2008/0052164 A1* | 2/2008 | Abifaker | 705/14 |
| 2008/0058014 A1 | 3/2008 | Khan et al. | |
| 2008/0114884 A1 | 5/2008 | Hewes et al. | |
| 2008/0120128 A1 | 5/2008 | Berglund et al. | |
| 2008/0167961 A1 | 7/2008 | Wentker et al. | |
| 2008/0207184 A1 | 8/2008 | Wassingbo et al. | |
| 2008/0208762 A1 | 8/2008 | Arthur et al. | |
| 2008/0238610 A1* | 10/2008 | Rosenberg | 340/5.7 |
| 2008/0257958 A1 | 10/2008 | Rothwell et al. | |
| 2008/0262928 A1 | 10/2008 | Michaelis | |
| 2008/0262929 A1 | 10/2008 | Behr | |
| 2009/0006254 A1 | 1/2009 | Mumm et al. | |
| 2009/0164322 A1 | 6/2009 | Khan et al. | |
| 2009/0192912 A1 | 7/2009 | Griffin et al. | |
| 2010/0030636 A1 | 2/2010 | Vijayshankar | |
| 2010/0063906 A1 | 3/2010 | Nelsen et al. | |
| 2010/0088188 A1 | 4/2010 | Kumar et al. | |
| 2010/0161410 A1 | 6/2010 | Tulloch | |
| 2010/0174598 A1 | 7/2010 | Khan et al. | |
| 2010/0241494 A1 | 9/2010 | Kumar et al. | |
| 2011/0082746 A1 | 4/2011 | Rice et al. | |
| 2011/0264490 A1 | 10/2011 | Durvasula et al. | |
| 2011/0296182 A1 | 12/2011 | Jia et al. | |
| 2012/0005026 A1 | 1/2012 | Khan et al. | |
| 2012/0029997 A1 | 2/2012 | Khan et al. | |
| 2012/0041823 A1 | 2/2012 | Khan | |
| 2012/0254030 A1 | 10/2012 | Khan et al. | |

FOREIGN PATENT DOCUMENTS

| | | |
|---|---|---|
| EP | 1 528 827 A2 | 5/2005 |
| JP | 2003271815 | 9/2003 |
| JP | 2006040249 | 2/2006 |
| KR | 10-2001-0069935 | 7/2001 |
| KR | 10-2001-0097065 | 11/2001 |
| KR | 10-2002-0004566 A1 | 1/2002 |
| KR | 10-2002-0096353 | 12/2002 |
| KR | 10-2003-0000447 | 1/2003 |
| KR | 10-2003-0013973 | 2/2003 |
| KR | 2003-0068226 | 8/2003 |
| KR | 10-2004-0032289 | 4/2004 |
| KR | 10-2004-0110659 | 12/2004 |
| KR | 10-2006-0022864 | 3/2006 |
| KR | 10-2007-0021751 | 2/2007 |
| KR | 10-2007-0051217 | 5/2007 |
| KR | 10-2008-0021436 | 3/2008 |
| KR | 10-2008-0025350 | 3/2008 |
| WO | WO 03/024139 A2 | 3/2003 |
| WO | WO 03/046742 A1 | 6/2003 |
| WO | WO 2004/021240 A1 | 3/2004 |
| WO | WO 2005/086593 A2 | 9/2005 |
| WO | WO 2005/098769 A1 | 10/2005 |
| WO | WO 2005/111882 A1 | 11/2005 |
| WO | WO 2006/055721 A2 | 5/2006 |
| WO | WO 2008/030307 A2 | 3/2008 |
| WO | WO 2009/061139 A1 | 5/2009 |
| WO | WO 2009/069982 A2 | 6/2009 |
| WO | WO 2010/042560 A2 | 4/2010 |
| WO | WO 2010/071859 A2 | 6/2010 |
| WO | WO 2011/150369 A2 | 12/2011 |
| WO | WO 2012/006090 A2 | 1/2012 |
| WO | WO 2012/024312 A2 | 2/2012 |

OTHER PUBLICATIONS

Commonly-assigned, co-pending U.S. Appl. No. 12/406,916 for "Methods, Systems and Computer Readable Media for Selecting and Delivering Electronic Value Certificates Using a Mobile Device," (filed Mar. 18, 2009).

"Idea: OnlineSecure Electronic Prepaid Virtual Debit Card," http://www.ideablob.com, 3 pages (Copyright 2007-2009).

"Mobile Money Transfer Fact Sheet," Western Union, http://corporate.westernunion.com/news_media_MobileMoney.html, 1 page (Copyright 2001-2009).

"EMO™—Electronic Money Orders—How EMO Works," https://www.emocorp.com, 1 page (Copyright 1999-2009).

"EMO™—Electronic Money Orders—Options for Moving Your Money with EMO," https://www.emocorp.com, 1 page (Copyright 1999-2009).

"Mobile Payments with PayPal—Send Money from Your Mobile Phone," https://www.paypal.com, 1 page, (Copyright 1999-2009).

"PayPal Mobile FAQ," https://www.paypal.com, 2 pages (Copyright 1999-2009).

"Texting with PayPal—Easy as Lifting a Finger," https://www.paypal.com, 1 page (Copyright 1999-2009).

Notice of Allowability for U.S. Appl. No. 11/514,698 (Nov. 17, 2008).

Notice of Allowance and Fee(s) Due for U.S. Appl. No. 11/514,698'(Aug. 28, 2008).

Non-Final Official Action for U.S. Appl. No. 12/340,568 (Aug. 8. 2011).

Final Official Action for U.S. Appl. No. 12/574,696 (Jun. 8, 2011).

Notification Concerning Transmittal of International Preliminary Report on Patentability for International Application No. PCT/US2009/059752 (Apr. 21, 2011).

First Office Action for Chinese Patent Application No. 200780040617.4 (Apr. 8, 2011).

Notification of Transmittal of the International Search Report and the Written Opinion of the International Searching Authority, or the Declaration for International Application No. PCT/US2009/059752 (May. 20, 2010).

Notification of Transmittal of the International Search Report and the Written Opinion of the International Searching Authority, or the Declaration for International Application No. PCT/US2009/053556 (Apr. 5, 2010).

Communication of European Publication Number and Information on the Application of Article 67(3) EPC for European application No. 07836358.7 (Apr. 29, 2009).

Notification for Transmittal of the International Search Report and the Written Opinion of the International Searching Authority, or the Declaration for the International Application No. PCT/US07/17091 (Jun. 26, 2008).

Notification of Transmittal of the International Search Report and the Written Opinion of the International Searching Authority, or the Declaration for International Application No. PCT/US2011/038408 (Feb. 29, 2012).

Non-Final Official Action for U.S. Appl. No. 12/574,696 (Feb. 28, 2012).

Supplemental Notice of Allowability for U.S. Appl. No. 12/340,568 (Feb. 6, 2012).

Second Office Action for Chinese Patent Application No. 200780040617.4 (Jan. 18, 2012).

Notification of Transmittal of the International Search Report and the Written Opinion of the International Searching Authority, or the Declaration for International Application No. PCT/US2009/068875 (Jan. 18, 2012).

(56) References Cited

OTHER PUBLICATIONS

Communication of European publication number and information on the application of Article 67(3) EPC for Application No. 10754103.9 (Dec. 29, 2011).
Notification of Transmittal of the International Search Report and the Written Opinion of the International Searching Authority, or the Declaration for International Application No. PCT/US2011/042186 (Dec. 28, 2011).
Notice of Allowance and Fee(s) Due for U.S. Appl. No. 12/340,568 (Dec. 20, 2011).
Declaration of Mohammad Khan for U.S. Appl. No. 12/340,568 (Dec. 15, 2011).
C-SAM's Answer to Defendant's Counterclaims in the United States District Court for the District of Delaware for Civil Action No. C.A. No. 11-881-GMS (Dec. 15, 2011).
Communication of European publication number and information on the application of Article 67(3) EPC for European Application No. 09833865.0 (Dec. 7, 2011).
Vivotech, Inc.'s Answer, Defenses and Counterclaims in the United States District Court for the District of Delaware for Civil Action No. C.A. No. 11-881-GMS (Nov. 21, 2011).
Non-Final Official Action for U.S. Appl. No. 12/406,916 (Oct. 5, 2011).
Communication of European publication number and information on the application of Article 67(3) EPC for European Application No. 09837222.0 (Sep. 28, 2011).
Applicant-Initiated Interview Summary for U.S. Appl. No. 12/574,696 (Sep. 26, 2011).
Extended European Search Report for European Application No. 07836358.7 (Sep. 22, 2011).
Communication of European publication number and information on the application of Article 67(3) EPC for European Application No. 09819787.4 (Jul. 6, 2011).
"ViVOnfc Suite," ViVOtech Products, http://www.vivotech.com/products/vivo_nfc/ index.asp, pp. 1-2 (Dec. 31, 2006).
"Giesecke & Devrient provides over the air personalization for handsets with PayPass," NFCNews, pp. 1-2 (Apr. 13, 2006).
"Information technology—Telecommunications and information exchange between systems—Near Field Communications—Interface and Protocol (NFCIP-1)," ISO/IEC 18092, pp. 1-66 (Apr. 1, 2004).
"Identification cards—Contactless integrated circuit(s) cards—Proximity cards—Part 2: Radio frequency power and signal interface," ISO/IEC 14443-2, pp. 1-10 (Jul. 22, 2003).
"Identification cards—Contactless integrated circuit(s) cards—Proximity cards—Part 4: Transmission protocol," ISO/IEC 14443-4, pp. 1-39 (Mar. 10, 2000).
"Identification cards—Contactless integrated circuit(s) cards—Proximity cards—Part 3: Initialization and anticollision," ISO/IEC 14443-3, pp. 1-48 (Jun. 11, 1999).
Official Action for U.S. Appl. No. 12/574,696 (Feb. 16, 2011).
Notification of Transmittal of the International Search Report and the Written Opinion of the International Searching Authority, or the Declaration for International Application No. PCT/US2010/027801 (Oct. 21, 2010).
Notification of Transmittal of the International Search Report and the Written Opinion of the International Searching Authority, or the Declaration for International Application No. PCT/US2009/069971 (Jul. 30, 2010).
Non-Final Official Action for U.S. Appl. No. 13/170,903 (Oct. 23, 2012).
Memo Concerning the Official Action for Mexican Patent Application No. MX/a/2011/001622 (Oct. 16, 2012).
Non-Final Official Action for U.S. Appl. No. 13/118,046 (Oct. 3, 2012).
Non-Final Official Action for U.S. Appl. No. 12/651,420 (Sep. 12, 2012).
Final Official Action for U.S. Appl. No. 12/406,916 (Sep. 4, 2012).
European Search Report for European Application No. 10754103.9 (Aug. 20, 2012).
Final Official Action for U.S. Appl. No. 12/574,696 (Aug. 7, 2012).
Chinese Patent Application No. 200780040617.4 for Notice of Granting Patent Right for Invention (Aug. 3, 2012).
Extended European Search Report for European Application No. 09819787.4 (Aug. 1, 2012).
First Office Action for Chinese Patent Application No. 200980140368.5 (Jul. 30, 2012).
Communication pursuant to Article 94(3) EPC for European Application No. 07 836 358.7 (Jul. 4, 2012).
Applicant-Initiated Interview Summary for U.S. Appl. No. 12/574,696 (Jun. 26, 2012).
Extended European Search Report for European Application No. 09807223.4 (Jun. 1, 2012).
First Office Action for Chinese Patent Application No. 200980148141.5 (Apr. 23, 2012).
Notification of Transmittal of the International Search Report and the Written Opinion of the International Searching Authority, or the Declaration for International Application No. PCT/US2011/047945 (Mar. 28, 2012).
"Notice from the European Patent Office dated Oct. 1, 2007 concerning business methods," Official Journal EPO, pp. 592-593 (Nov. 2007).
Communication of European publication number and information on the application of Article 67(3) EPC for European Application No. 11818673.3 (May 29, 2013).
Examiner's Answer for U.S. Appl. No. 12/574,696 (May 20, 2013).
Memo Concerning the Official Action for Mexican Patent Application No. MX/a/2011/001622 (Apr. 29, 2013).
Final Office Action for U.S. Appl. No. 13/170,903 (Apr. 5, 2013).
Communication of European publication number and information on the application of Article 67(3) EPC for European Application No. 11804128.4 (Apr. 4, 2013).
Communication Pursuant to Article 94(3) EPC for European Patent Application No. 09807223.4 (Mar. 14, 2013).
Communication of European Publication Number and Information on the Application of Article 67(3) EPC for European Patent Application No. 11787521.1 (Mar. 13, 2013).
European Search Report for European Patent Application No. 09837222.0 (Feb. 12, 2013).
Summons to Attend Oral Proceedings for European Patent Application No. 07836358.7 (Feb. 11, 2013).
Second Office Action for for Chinese Patent Application No. 200980148141.5 (Jan. 31, 2013).
Notice of Panel Decision from Pre-Appeal Brief Review for U.S. Appl. No. 12/574,696 (Dec. 12, 2012).
Result of Consultation for European Patent Application No. 07836358.7 (Jul. 5, 2013).
Notification of Transmittal of the International Search Report and the Written Opinion of the International Searching Authority, or the Declaration for International Application No. PCT/US2013/037803 (Aug. 21, 2013).
Final Office Action for U.S. Appl. No. 12/651,420 (Aug. 2, 2013).
Result of consultation for European Application No. 07 836 358.7 (Jul. 18, 2013).
Second Office Action for Chinese Patent Application No. 200980140368.5 (Jun. 4, 2013).

\* cited by examiner

METHODS, SYSTEMS AND COMPUTER READABLE MEDIA FOR ELECTRONICALLY DELIVERING A PREPAID CARD TO A MOBILE DEVICE

TECHNICAL FIELD

The subject matter described herein relates to electronic prepaid cards using short message service (SMS) messaging and over the air provisioning (OTA). More particularly, the subject matter described herein relates to methods, systems, and computer readable media for electronically delivering a prepaid card to a mobile device.

BACKGROUND

Currently, the primary means for purchasing prepaid cards, such as a gift card, involves a consumer visiting a brick and mortar store, selecting a physical prepaid card, and conducting a normal purchase transaction with a cashier. Alternatively, the consumer may purchase the prepaid card over the Internet by visiting the merchant's web site using a personal computer to conduct a secured electronic payment transaction using a credit card. Regardless of the manner in which the prepaid card is purchased, the end result is normally the same. Namely, the consumer physically receives a plastic prepaid card (e.g., a magnetic stripe gift card) from the cashier at the store or from the merchant via the mail. Similarly, a second party (e.g., a gift recipient) may physically receive the prepaid card either in the mail (i.e., from either the consumer, or directly from the merchant) or in person from the consumer.

Regardless of the manner in which the recipient ultimately receives the prepaid card, the prepaid card is usually provided as a tangible, physical card. As such, the fact the prepaid card is a tangible, physical card may give rise to several problems. For instance, due to its size, the physical prepaid card may be readily misplaced, stolen, or even damaged prior to the consumer using the prepaid card. Moreover, a physical prepaid card cannot be immediately presented to a recipient as a gift if the purchaser and recipient (i.e., sender and recipient) are geographically separated. Rather the presentation of the prepaid card to the recipient is typically limited to conventional mail services.

Accordingly, there exists a need for methods, systems, and computer readable media for electronically delivering a prepaid card to a mobile device.

SUMMARY

Methods, systems, and computer readable media for electronically delivering a prepaid card to a mobile device are disclosed. According to one aspect, the method includes receiving, at a merchant server, purchase information related to the purchase of an electronic prepaid card. The method further includes receiving, from the merchant server, electronic prepaid card information derived from the purchase information. The method further includes establishing a communications link with a mobile device associated with address data included in the electronic prepaid card information. The method also includes provisioning the electronic prepaid card information on the mobile device via over the air (OTA) communications.

The subject matter described herein for electronically delivering a prepaid card to a mobile device may be implemented using a computer readable medium having stored thereon computer executable instructions that when executed by the processor of a computer perform steps of the aforementioned method (see above). Exemplary computer readable media suitable for implementing the subject matter described herein includes disk memory devices, programmable logic devices, and application specific integrated circuits. In one implementation, the computer readable medium may include a memory accessible by a processor. The memory may include instructions executable by the processor for implementing any of the methods for electronically delivering a prepaid card to a mobile device described herein. In addition, a computer readable medium that implements the subject matter described herein may be distributed across multiple physical devices and/or computing platforms.

BRIEF DESCRIPTION OF THE DRAWINGS

The subject matter described herein will now be explained with reference to the accompanying drawings of which.

DETAILED DESCRIPTION

In order to eliminate the need for users to carry physical cards (e.g., a credit card), card issuers have begun making softcards available to the general public. As used herein, the term "softcard" refers to a software-implemented entity for facilitating transactions, such as payment transactions. Examples of softcards include payment cards, such as credit cards, loyalty cards, member cards, identification cards, and other payment and non-payment cards that exist in an electronic or software-based format.

A softcard may be provisioned on a device with wireless communications capabilities. Devices with wireless communication capabilities are typically configured to interact with wireless readers to enable transactions involving the softcard. Examples of devices with wireless communications capabilities include mobile phones, smart phones, key fobs, physical cards, and personal digital assistants with interfaces to local card readers. Interactions between a device and a reader may occur via an electric and/or magnetic field between the device and the reader. One type of communications channel that may be used between a device capable of supporting a softcard and a card reader for payment transactions is near field communications (NFC). Near field communications typically occur at a distance of within about one wavelength of the communications frequency being used between the device and the contactless card reader. Example of a contactless communications protocol that may be used in communications between a device capable of supporting a softcard and a contactless, or wireless, reader is an ISO 14443 interface.

Devices with wireless communications capabilities may also be capable of data communications with remote entities. For example, devices with wireless communications capabilities may implement HTTP over TCP/IP over-the-air interface for communicating with remote entities. The air interface protocol used by a device with wireless communications capabilities may vary with the device. Examples of air interface protocols that may be used include GSM, GPRS, CDMA, Bluetooth, etc.

Figure 1:
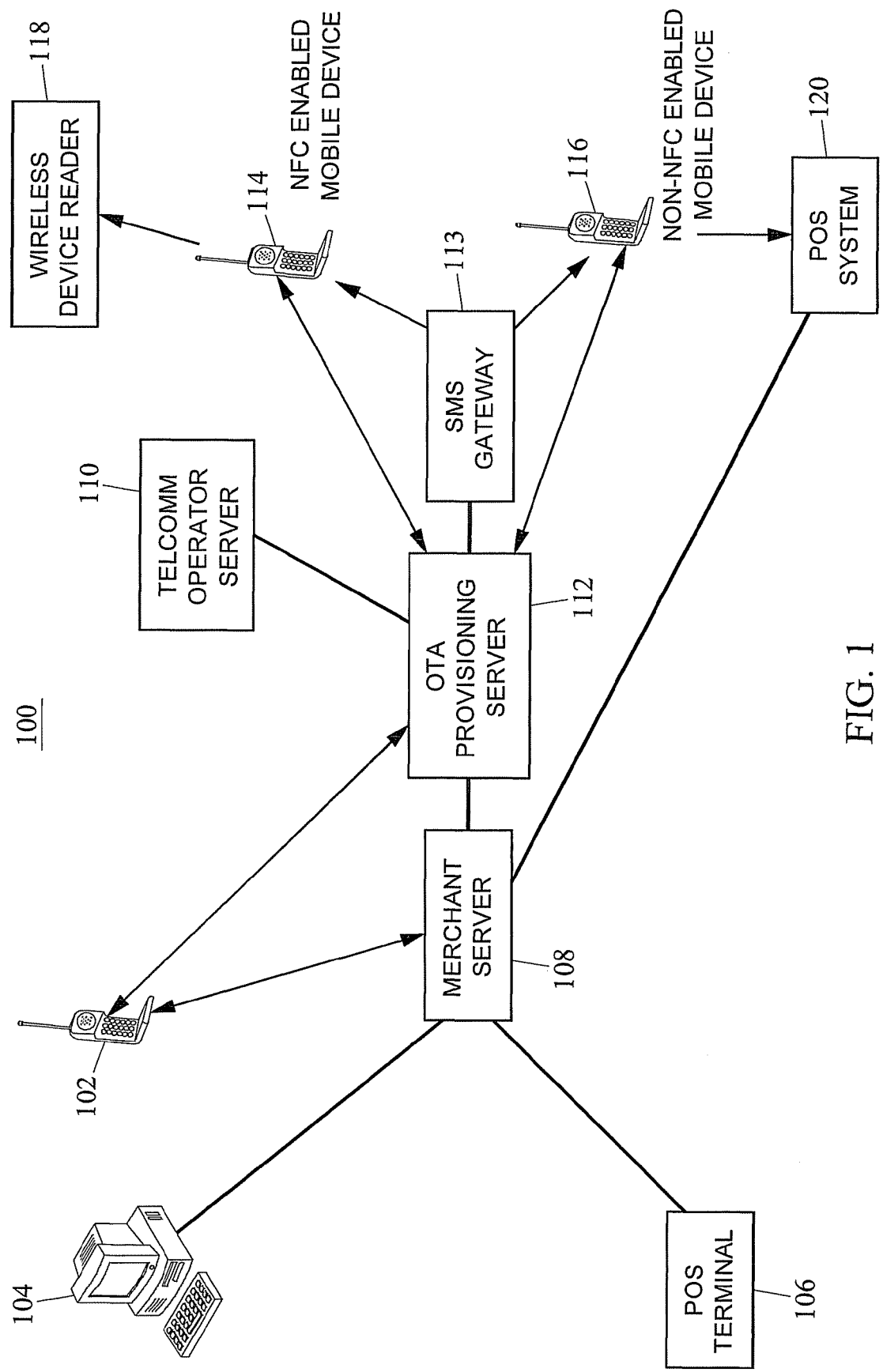
FIG. 1 is a block diagram depicting an exemplary system for electronically delivering a prepaid card to a mobile device according to an embodiment of the subject matter described herein.

FIG. 1 is a block diagram of an exemplary system 100 for electronically delivering a prepaid card to a mobile device according to an embodiment of the subject matter described herein. In one embodiment, system 100 comprises a plurality of devices, which may include a mobile device 102, a computer 104, or a point of sale (POS) terminal 106. Notably, devices 102-106 provide a sender with the necessary means to provide (e.g., purchase or forward) an electronic prepaid card to a recipient party. As used herein, the term "sender" refers to a user who purchases a prepaid card (e.g., an electronic gift card) for the benefit of a "recipient" via a merchant website, store cashier, and the like. Likewise, as used herein, the term "recipient" refers to a user that receives the electronic prepaid card in the form of a softcard (or a short message service (SMS) message containing an authorization code that may subsequently be used to obtain a physical prepaid card in an alternate embodiment). It should also be noted that the sender and recipient may be the same entity in certain scenarios.

In one embodiment, a sender uses computer 104, which may include a personal computer (e.g., at the sender's home) or a kiosk station (e.g., positioned at or near a merchant/retail store), to access a merchant's web site. As used herein, the term "merchant" may include a seller, a retailer, or any other like entity that sells goods or services. By using the interface presented by the merchant web site, the sender may purchase an electronic prepaid card by providing various types of information. For example, one type of information may comprise recipient information. Recipient information may include the name of the recipient, the mobile phone number associated with the recipient, and even a personal message (e.g., "Happy Birthday") for the recipient. In another embodiment, a prepaid card purchase transaction described above may be conducted using a POS terminal 106 (e.g., a cash register computer, a self-checkout machine, etc.) located at the merchant store with or without the assistance of a cashier.

System 100 may also include a merchant server 108, a telecommunications operations server 110, and an over-the-air (OTA) provisioning server 112. In one embodiment, merchant server 108 may comprise a backend server that is associated with a particular merchant, retailer, or internet-based store. Telecommunications operator server 110 may include a server associated with a telecommunications service provider (e.g., a wireless phone service provider) that is capable of providing information related to a given mobile device and/or phone number. For example, server 110 may contain phone numbers and the type of mobile device associated with each phone number. OTA provisioning server 112 may include a server that is responsible for receiving and validating prepaid card information from various merchant servers (e.g., merchant server 108) as well as issuing electronic prepaid card information to mobile devices (e.g., mobile devices 114, 116, as explained below) per the instructions and information received from the merchant servers. In one embodiment, the functions provided by OTA provisioning server 112 may be performed by a plurality of servers (e.g., a control server, which provides OTA administrative services for the secure element on a mobile device, and an issuer server, which provides a secure local provisioning point for issuing softcards to a mobile device in order to allow an issuer to maintain full possession and control of softcard data).

System 100 may also include a near field communications (NFC) enabled mobile device 114, a non-NFC enabled mobile device 116, a wireless device reader 118, and a POS system 120. In one embodiment, wireless device reader 118 may be co-located and/or incorporated within POS system 120 (e.g., at the same retail store). In one embodiment, POS system 120 may include a cash register/computer operated by a cashier.

NFC enabled mobile device 114 may include a mobile phone with embedded NFC support circuitry/software, which enables a user to wirelessly communicate with wireless device reader 118. Similarly, NFC enabled mobile device 114 may include universal subscriber identification module (USIM)/USIM integrated circuit card (UICC) NFC support circuitry/software to wirelessly communicate with the wireless device reader.

In contrast, non-NFC enabled mobile device 116 may include a cellular phone that does not include embedded NFC or USIM/UICC NFC support circuitry/software or any other means to wirelessly communicate with contactless card reader 118. In one embodiment, wireless device reader 118 may include any reader (e.g., a wireless RFID reader or a contactless card reader) that is capable of reading wireless smart cards, NFC enabled mobile devices, or any other contactless payment type device. In one embodiment, wireless device reader 118 may wirelessly communicate with NFC-enabled mobile device 114 via an electromagnetic field.

Specifically, NFC involves communication via magnetic field induction, where two loop antennas are located within each other's near field, which effectively forms an air-core transformer. For example, an NFC enabled mobile device 114 may communicate with wireless device reader 118 via the inductive coupling of the reader's antenna to the mobile device's antenna. Wireless device reader 118 modulates the loading on its loop antenna in order to amplitude-modulate a radio frequency (RF) field/electromagnetic field. The modulations in the field are received and detected by the mobile device's antenna, thereby communicating information. In order to communicate, a transceiver module on the contactless reader may transmit a command signal to the mobile device via the electromagnetic field (or some other energy field) powered by contactless reader. For example, by oscillating the electromagnetic field on and off very quickly, the contactless reader (via the transceiver module) is able to send a command as a string of data to mobile device 114. Similarly, by drawing power from the electromagnetic field or using its own power source, mobile device 114 is able to send a response to contactless reader 118 by creating a short circuit on its own antenna. The short circuit produces a larger load on the reader's antenna, which is promptly detected as a communication from mobile device 114. An example of a near-field wireless communications standard commonly used by NFC enabled mobile devices and wireless smart cards is ISO 14443.

As mentioned above, there are several ways in which a sender may electronically provide a prepaid card to the recipient. In one embodiment, the prepaid card may be purchased by a sender through a merchant's web site. For example, the sender/purchaser may log into a merchant/retailer website (e.g., using personal computer 104 or a retail kiosk) in order to select a prepaid card type (e.g., a gift card), the amount of funds to be placed on the card, and the time and date of electronic delivery of the card to the recipient (i.e., transaction information). The sender may also provide recipient information that includes the name of the intended recipient (e.g., the recipient may be the sender/purchaser himself or a second party) of the electronic prepaid card and an associated mobile device number. Likewise, the sender may also be permitted to send a message along with the electronic prepaid card information (e.g., "Happy Birthday"). After providing the above "transaction" and "recipient" information, the sender may provide the necessary "payment" information (e.g., by swiping a plastic credit card at a kiosk, entering a checking account or credit card number via a web site interface, etc.) to pay for the electronic prepaid card. In one embodiment, all of the above transaction, recipient, and payment information (i.e., collectively the "purchase data") is provided to a merchant server 108.

In an alternate embodiment, the sender may instead purchase the electronic prepaid card at a merchant point of sale (e.g., POS terminal 106). For example, the sender may approach the cashier at the merchant store and select the electronic prepaid card type (e.g., a gift card), the amount, and the time and date of delivery (i.e., transaction data). The sender may then provide payment, such as cash or credit card/checking account information (i.e., payment data), for the electronic prepaid card. The sender can also provide the information associated with the recipient (i.e., recipient data), such as the recipient's name, the recipient's mobile device phone number, and a personal message (e.g., "Happy Birthday!") to the cashier. The cashier may process the transaction and present a receipt to the sender. After the purchase data (e.g., transaction information, the payment information, and recipient's information) is entered into the cash register/computer (e.g., POS terminal 106), the data is sent to merchant server 108.

Upon receiving the purchase data, merchant server 108 may be configured to perform a series of operations. In one embodiment, merchant server 108 sends a confirmation SMS message and/or email message to the sender. In one embodiment, the sender's contact number or email address is provided at the time the electronic prepaid card is purchased. The confirmation message may contain a purchase receipt as well as other details related to the electronic prepaid card or purchase transaction. In one embodiment, merchant server 108 may process the received purchase data from the sender. For example, merchant server 108 may generate additional prepaid card information such as the prepaid card number, the prepaid card image, a prepaid card authorization code, and the prepaid card validity information in response to receiving the purchase data. Likewise, merchant server 108 may generate personalization information using the purchase data obtained from the sender.

In one embodiment, merchant server 108 sends the above-mentioned data to OTA provisioning server 112 via a request message. For example, the request message may be embodied as a message requesting that OTA provisioning server 112 issue an electronic prepaid card (e.g., either a softcard or an SMS authorization code) to the recipient mobile phone number provided. Upon receiving the purchase data and generated electronic prepaid card data, OTA provisioning server 112 may be configured to determine if the recipient mobile device is NFC enabled (e.g., mobile device 114) or not (e.g., mobile device 116). In one embodiment, OTA provisioning server 112 provides telecommunications operations server 110 with the mobile device number of a receiving party. Telecommunications operations server 110 may then access a database to obtain information relating to the type of cellular phone (e.g., NFC enabled or otherwise) that is associated with the provided mobile device number. Upon locating this device information, telecommunications operations server 110 forwards the mobile device type data to OTA provisioning server 112. After receiving the mobile device type information and prepaid card information, OTA provisioning server 112 is configured to deliver the prepaid card as either a softcard or an SMS message. The manner in which the electronic prepaid card is sent depends if the phone number to which the prepaid card is to be delivered is either an NFC enabled phone or non-NFC enabled phone. If the former, then OTA provisioning server 112 is configured to deliver the prepaid card as a softcard. Alternatively, if the phone number to which the prepaid card is to be delivered is associated with a non-NFC enabled phone, then OTA provisioning server 112 is configured to deliver the prepaid card as a code via an SMS message. Notably, a non-NFC enabled phone is not configured to transfer a prepaid softcard to a wireless device reader.

In the exemplary embodiment where the receiving mobile device is NFC enabled, OTA provisioning server 112 sends a control SMS message to NFC enabled mobile device 114 using the mobile phone number provided by merchant server 108. In response, NFC enabled mobile device 114 may read the SMS control content, which triggers a wallet client application (not shown) to initiate a downloading process to receive an electronic prepaid card from OTA server 112. NFC enabled mobile device 114 (e.g., via wallet client) may then reply to OTA provisioning sever 112 with an acknowledgement message. In one embodiment, a wallet client application may include a software application that manages multiple softcards stored on a mobile device, such as credit cards, debit cards, prepaid cards, electronic coupons, electronic tickets and the like. The wallet client may also be configured to ensure end-to-end protection of softcard data and payment applications with its interface for OTA provisioning as well as its management of the mobile device's secure element (not shown). The secure element may include any type of hardware and/or software structure that utilizes encryption or any other means for securing sensitive data within a mobile device.

In response to the acknowledgement message, OTA provisioning server 112 may establish a secure connection using, for example, an http/https/TCP/SMS PP/CAT_TP protocol with NFC enabled mobile device 114 and provides prepaid personalization data (e.g., similar to Track 1 and Track 2 data) along with branding or issuer marketing data (e.g., branding image, customer support number, network supported, and the like). In one embodiment, the personalization data is stored on a secure element validated within mobile device 114.

After the download process is completed, the wallet client displays the electronic prepaid card as a softcard (which visually represents the personalization data contained in the secure element). Once the downloading process is complete, OTA provisioning server 112 may then send a message instructing merchant server 108 to send an SMS message to the original purchaser 102 to notify that the delivery of the prepaid softcard was successful.

Once the prepaid softcard is stored in NFC enabled mobile device 114, the recipient may decide to use the electronic prepaid softcard at an appropriate retail store or the like. For instance, after deciding what goods to purchase at a store, the recipient brings the merchandise to the check out station and is prompted by the cashier to provide a method of payment. The recipient may then use mobile device 114 to select the prepaid softcard. For example, the recipient may interface mobile device 114 with contactless card reader 118 via NFC communication. Personalization data associated with the prepaid softcard is then transferred to wireless device reader 118. Namely, the transfer of this information facilitates a secure payment transaction by providing electronic funds for payment. The transaction then proceeds as normal if the funds were sufficient to cover the purchased goods, otherwise the customer is prompted to provide additional payment for the outstanding balance.

In the second embodiment mentioned above, the electronic prepaid card is provided to a non-NFC enabled phone via SMS messages. For example, mobile device 116 may receive an SMS message from OTA provisioning server 112 instead of receiving an SMS control message. The received SMS message may include a prepaid card authorization code. This authorization code is associated with a previously registered amount of funds and may be provided to a cashier at POS system 120 as detailed below.

After receiving the prepaid card authorization code, the recipient of mobile device 116 may decide to use the electronic prepaid card at a retail store or the like. For example, after selecting goods for purchase, the recipient presents the merchandise at the check out counter and may be prompted by the cashier to provide a method of payment. The recipient may then provide the prepaid card authorization code and the phone number of mobile device 116 to the cashier. The cashier may then enter the authorization code and the phone number in the POS system 120. In one embodiment, POS system 120 validates the authorization code and phone number with merchant server 108 to ensure that the correct recipient receives the proper funds or the authorization code has not been previously used. Merchant server 108 may return information that indicates the amount of funds associated with the prepaid card if the authorization code is valid. At this point, merchant server 108 may send an SMS message and/or email message, which indicates the successful delivery of the prepaid card, to the user device (e.g., mobile device 102) of the original purchaser/sender. The cashier may then confirm the amount of funds with the user of mobile device 116. Once validated, the cashier will encode the dollar amount onto a plastic magnetic stripe card, which is then activated. The recipient of the plastic magnetic stripe card may then use the card for his purchase. In an alternate embodiment, the cashier may use a portion of the validated dollar amount for the purchase of the customer's merchandise and encode the outstanding dollar amount onto the plastic magnetic stripe card.

Figure 2:
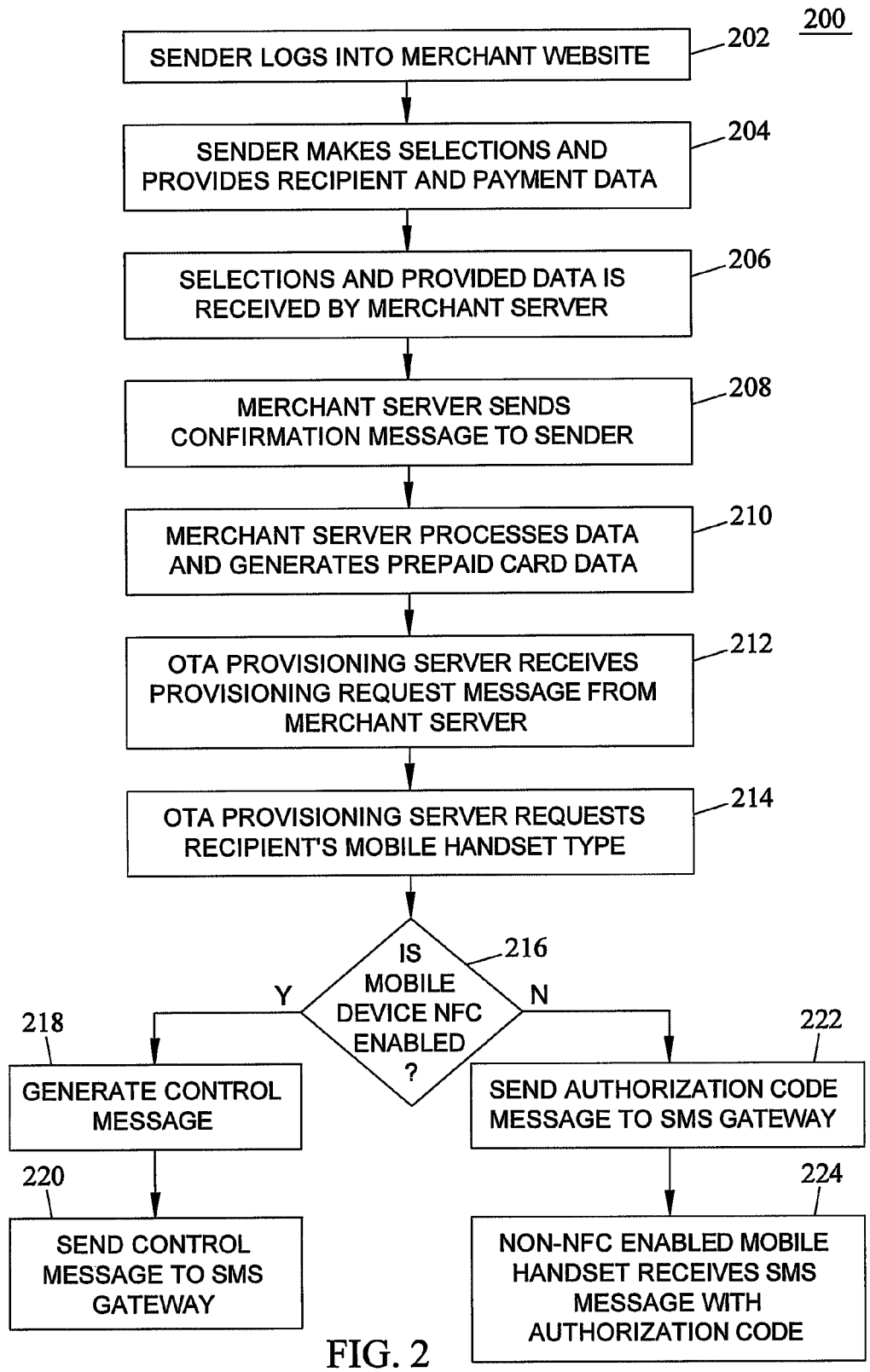
FIG. 2 is a flow chart depicting an exemplary process for purchasing an electronic prepaid card according to an embodiment of the subject matter described herein.

To better illustrate the communication of the components depicted in FIG. 1, FIG. 2 is provided to describe a purchasing transaction process using a flow diagram. Specifically, FIG. 2 is a flow chart of an exemplary method 200 for purchasing an electronic prepaid card according to an embodiment of the subject matter described herein.

In block 202, the sender logs into a merchant's website. In one embodiment, the sending party using personal computer or a kiosk computer station to gain access to the merchant's website.

In block 204, the sender makes selections and provides recipient and payment data. In one embodiment, the sender uses the website interface to select a specific type of prepaid card, the amount of money to be placed on the prepaid card, and the date and time in which the prepaid card should be delivered to the recipient. The sender may also provide a credit card account number or the like to pay for the electronic prepaid card.

In block 206, the sender's selections and provided data are received by a merchant server. In one embodiment, after finalizing the selections and confirming the recipient and payment data, the sender electronically submits (e.g., hits the "submit" button) the information to merchant server 108.

In block 208, the merchant server sends a confirmation message. In one embodiment, merchant server 108 sends an SMS or email confirmation message to the sender. The confirmation message may include a purchase receipt or some other detailed information regarding the purchase transaction.

In block 210, the merchant server processes data and generates prepaid card data. In one embodiment, merchant server 108 processes the received purchase data from the sender (e.g., the transaction data, the recipient data, and the payment data). For example, merchant server 108 utilizes the purchase data to generate other data that is unique to the prepaid card, such as a prepaid card number, a prepaid card authorization code, a prepaid card image, prepaid card personalization information, and prepaid card validity information.

In block 212, an OTA provisioning server receives a provisioning request message. In one embodiment, OTA provisioning server 112 receives a message from merchant server 108 to issue an electronic prepaid card to a recipient that is associated with a specific mobile phone number (i.e., the mobile phone number provided by the sender in block 204). The request message may also include other information, such as the personal message and the prepaid card amount similarly provided in block 204. Likewise, the request message may also include the information generated by merchant server 108 in block 210.

In block 214, the OTA provisioning server requests the recipient's mobile device or handset type. In one embodiment, OTA provisioning server 112 sends a query to a telecommunications operations server 110 requesting the type of handset associated with the recipient's mobile device number.

In block 216, a determination is made as to whether the recipient's handset is an NFC enabled mobile device or a non-NFC enabled mobile device. If OTA provisioning server 112 ascertains that the recipient's device is an NFC enabled mobile device, then method 200 continues to block 218. Otherwise, method 200 continues to block 222 where OTA provisioning server 112 sends an authorization code message to SMS gateway 113. In response (i.e., block 224), SMS gateway 113 sends an SMS message embedded with the authorization code to non-NFC enabled mobile handset 116.

In block 218, a control short message is generated. In one embodiment, OTA provisioning server 112 generates a control (binary) short message service (SMS) message to instruct the recipient's NFC enabled mobile device to activate a wallet client application.

In block 220, the control short message is sent to an SMS gateway. In one embodiment, SMS gateway 113 may receive the control (binary) short message and send the message to recipient mobile device 114.

Figure 3:
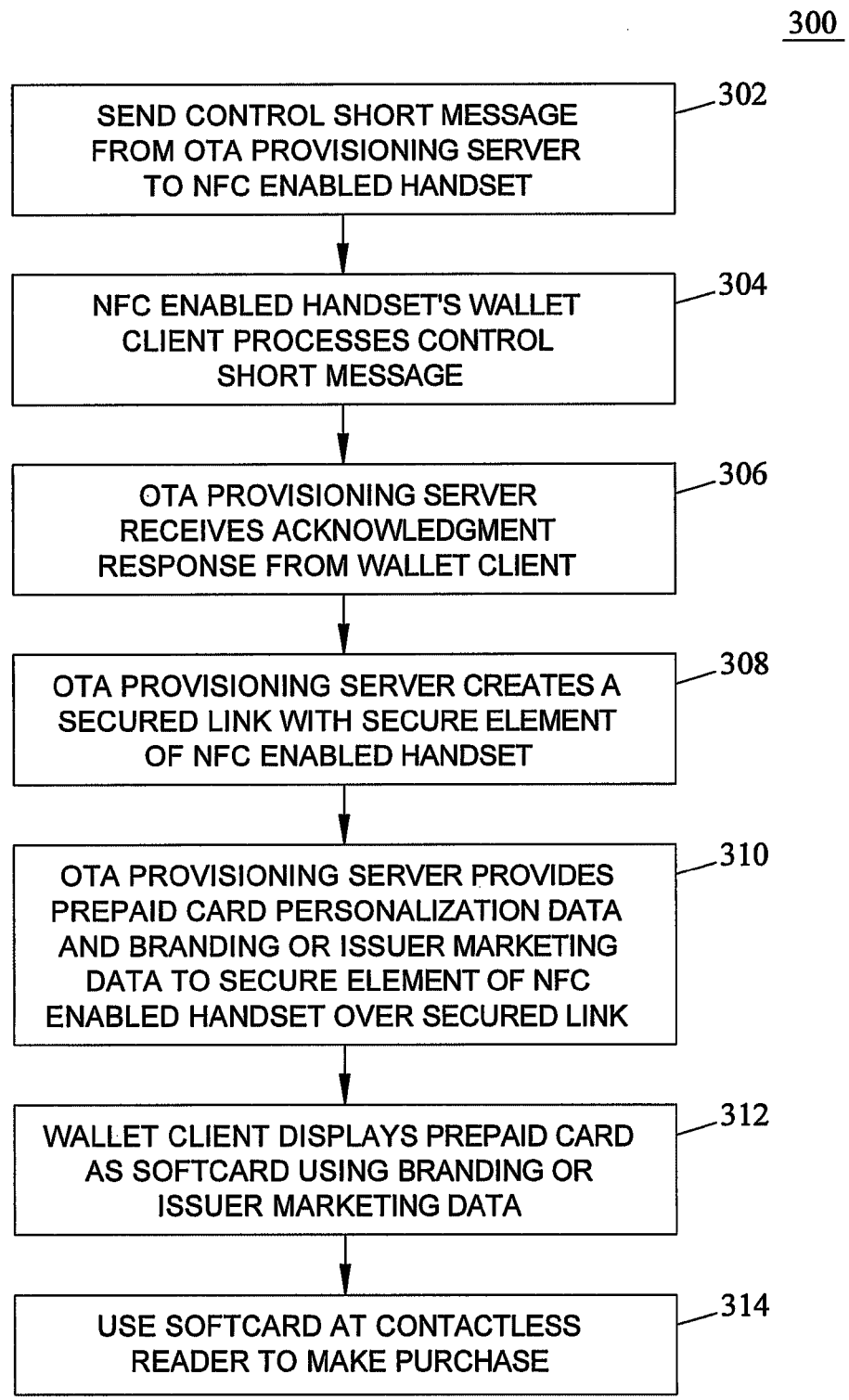
FIG. 3 is a flow chart depicting an exemplary process for issuing an electronic prepaid card to a near field communications (NFC) enabled mobile device according to an embodiment of the subject matter described herein.

To better illustrate the issuance of an electronic prepaid card in an NFC enabled mobile device, FIG. 3 is provided to depict a flow chart of an exemplary method 300 for issuing an electronic prepaid card according to an embodiment of the subject matter described herein.

In block 302, a control short message is received by an NFC enabled handset. In one embodiment, OTA provisioning server 112 sends a control SMS message (via SMS gateway 113) to NFC enabled mobile device 114.

In block 304, the NFC enabled handset processes the control SMS message. In one embodiment, a wallet client of mobile device 114 is instructed by the control short (binary) message to initiate a download process. Mobile device 114 may also send a message acknowledging receipt of the control short message to OTA provisioning server 112.

In block 306, the OTA provisioning server receives an acknowledgement message from the NFC enabled handset. In one embodiment, OTA provisioning server 112 receives a message acknowledging the receipt of the control message from the wallet client in mobile device 114.

In block 308, the OTA provisioning server creates a secured link with NFC enabled handset. In one embodiment, OTA provisioning server 112 established a secured line of communications with the wallet client and secure memory of mobile device 114.

In block 310, the OTA provisioning server provides personalization data over the secured link. In one embodiment, OTA provisioning server 112 uploads personalization data to the secure element in mobile device 114 over the established secured link.

In block 312, the NFC enabled handset displays the prepaid card as a softcard. In one embodiment, the wallet client in mobile device 114 displays the electronic prepaid card, which is a graphical representation associated with the stored personalization data, as a softcard.

In block 314, the prepaid softcard is used at a wireless device reader to make a purchase. In one embodiment, the user of mobile device 114 (i.e., the recipient) may approach a contactless reader 118 at a retail store and utilize the prepaid softcard to make a purchase. For example, the user may select the prepaid softcard from the wallet client graphical user interface (GUI) and interface NFC enabled mobile device 114 with wireless device reader 118 (e.g., bring the two devices in close proximity). By interfacing mobile device 114 with wireless device reader 118, personalization data is provided to the wireless device reader 118, which in turn provides the data to a cashier device (e.g., a POS system) in order to facilitate the payment transaction.

Figure 4:
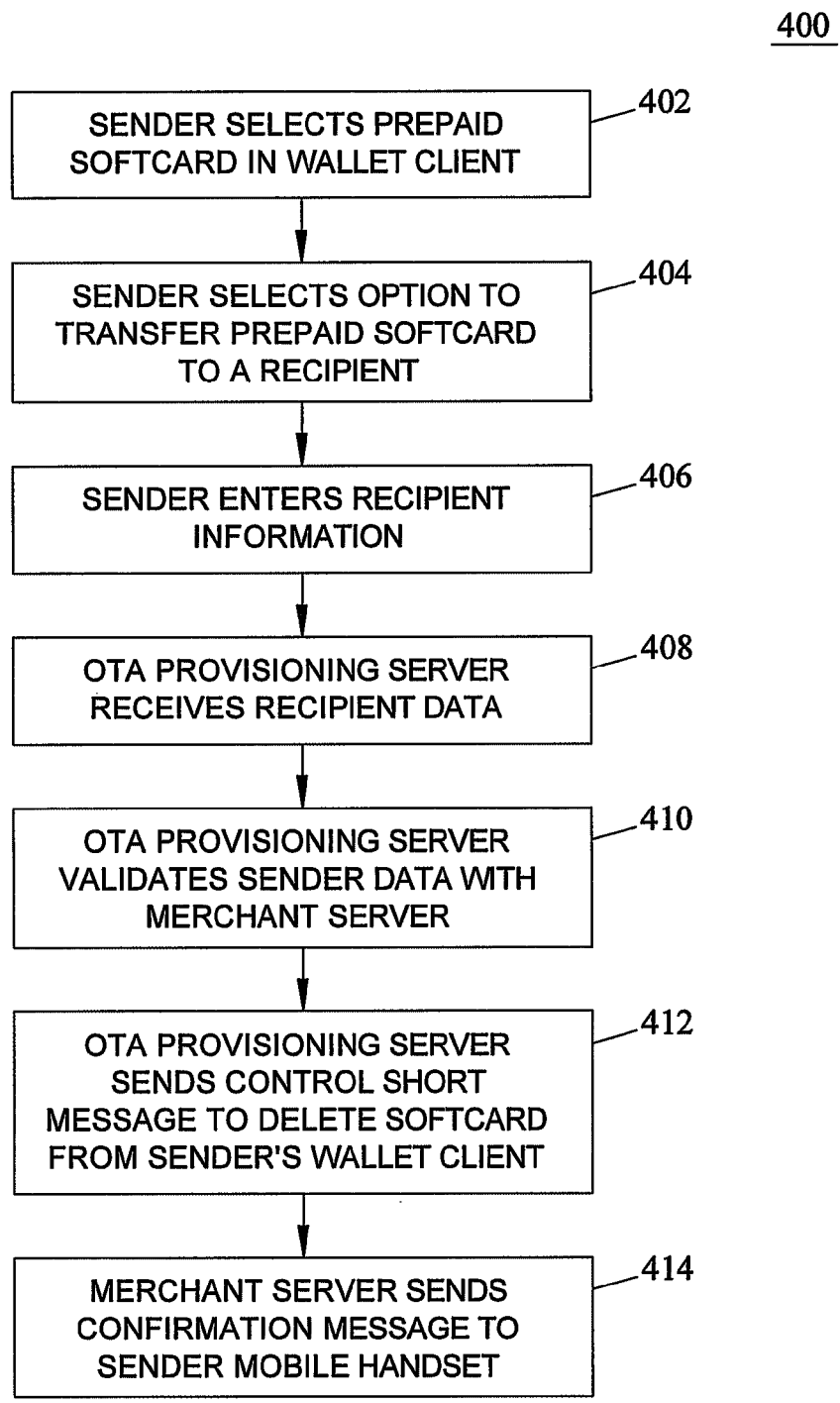
FIG. 4 is a flow chart depicting an exemplary process for transferring an electronic prepaid card from a first near field communications (NFC) enabled mobile device to a second NFC enabled mobile device according to an embodiment of the subject matter described herein.

In another embodiment of the present subject matter, a sender may decide to transfer or forward an electronic prepaid card, which has been previously purchased and is stored on the sender's NFC enabled mobile device, directly to a recipient's mobile device. FIG. 4 illustrates an exemplary method 400 for transferring an electronic prepaid softcard from a sender's NFC enabled mobile device (e.g., mobile device 102) to a recipients' NFC enabled mobile device (e.g., mobile device 114).

In block 402, a sender selects a prepaid softcard in the sender's NFC enabled mobile device. In one embodiment, the sender may select a previously obtained prepaid card that is stored in the wallet client for transfer.

In block 404, the sender transfers the prepaid softcard to a recipient. In one embodiment, the sender may select an option to forward the electronic prepaid softcard to a recipient's NFC enabled mobile device.

In block 406, the sender is prompted to provide recipient information. In one embodiment, NFC enabled mobile device 102 may query the sender to provide the recipient's information, such as the recipient's name, mobile phone number, and/or a personal message.

In block 408, the sender's NFC enabled mobile device sends a transfer request. In one embodiment, NFC enabled mobile device 102 sends a transfer request message to OTA provisioning server 112. The transfer request message may include the recipient information obtained in block 406 as well as personalization data associated with the sender's NFC enabled mobile device (e.g., this data may only include sender's phone number, the balance of the softcard, and/or personalization data).

In block 410, the OTA provisioning server validates the sender data. In one embodiment, OTA provisioning server 112 establishes communication with merchant server 108 in order to validate the sender's information with information stored on merchant server 108 (e.g., verify that the data from the sender's phone corresponds to the data stored in merchant server 108). Similarly, merchant server 108 may also be provisioned with data associated with the intended recipient so as to record the transfer (i.e., the recipient is the new "owner" of the transferred electronic prepaid card).

In block 412, the OTA provisioning server 112 sends a control short message to delete the softcard (e.g., the personalization data) from sender's NFC enabled handset. In one embodiment, OTA provisioning server 112 may conduct the transfer of the prepaid softcard by disassociating the electronic prepaid card from the sender's mobile device and subsequently associating the electronic prepaid card to the recipient's mobile device if the information in block 410 is validated. For example, OTA provisioning server 112 may send a command to disassociate, or delete, the personalization data from the sender's NFC enabled handset client application. Similarly, OTA provisioning server 112 may then send another control short message to the recipient's NFC enabled mobile device in order to initiate the issuing of an electronic prepaid softcard. In one embodiment, OTA provisioning server 112 may transfer the "new" prepaid softcard in the manner described by method 300 in FIG. 3.

In block 414, a confirmation message is sent to the sender's mobile device. In one embodiment, OTA provisioning server 112 sends a confirmation message to mobile device 102 indicating that the transfer process was successful. The recipient may now freely use the transferred prepaid softcard utilizing the recipient mobile device (e.g., mobile device 114).

It will be understood that various details of the subject matter described herein may be changed without departing from the scope of the subject matter described herein. Furthermore, the foregoing description is for the purpose of illustration only, and not for the purpose of limitation.

What is claimed is:

1. A method for electronically delivering a prepaid card to a mobile device, the method comprising:
   receiving, at a merchant server, purchase information related to the purchase of an electronic prepaid card, wherein the purchase information includes recipient information associated with a near field communications (NFC) enabled mobile device configured to be provisioned with the electronic prepaid card;
   receiving, at an over the air (OTA) provisioning server and from the merchant server, electronic prepaid card information derived from the purchase information including the recipient information;
   establishing a communications link between the OTA provisioning server and the NFC enabled mobile device associated with the recipient information; and
   provisioning, by the OTA provisioning server, the electronic prepaid card information on the NFC enabled mobile device over the communications link via OTA communications, wherein the electronic prepaid card information is transferable from the NFC enabled mobile device to a wireless device reader via near field communications, wherein provisioning the electronic prepaid card information on the NFC enabled mobile device includes delivering, from the OTA provisioning server to the NFC enabled mobile device via OTA communications, personalization data that is used to generate a softcard prepaid card in the NFC enabled mobile device.

2. The method of claim 1 wherein the electronic prepaid card information comprises a prepaid card authorization code.

3. The method of claim 1 further comprising:
storing the electronic prepaid card information on the NFC enabled mobile device as a prepaid softcard and personalization data.

4. The method of claim 3 further comprising:
storing the personalization data within a secure element in the NFC enabled mobile device.

5. The method of claim 1 further comprising:
sending a message to the merchant server indicating a successful delivery of the electronic prepaid information to the NFC enabled mobile device.

6. The method of claim 5 further comprising:
sending a confirmation message to the original purchaser of the electronic prepaid card from the merchant server indicating a successful delivery of the electronic prepaid information to the NFC enabled mobile device.

7. The method of claim 1 further comprising: transferring the personalization data to the wireless device reader in order to conduct a payment transaction.

8. A system for electronically delivering a prepaid card to a mobile device, the system comprising:
a merchant server for receiving purchase information related to the purchase of an electronic prepaid card and generating electronic prepaid card information, wherein the purchase information includes recipient information associated with a near field communications (NFC) enabled mobile device configured to be provisioned with the electronic prepaid card; and
an over the air (OTA) provisioning server for receiving the electronic prepaid card information from the merchant server, establishing a communications link with the NFC enabled mobile device associated with the recipient information included in the prepaid card information, and provisioning the electronic prepaid card information to the NFC enabled mobile device over the communications link via over the air (OTA) communications, wherein the electronic prepaid card information is transferable from the NFC enabled mobile device to a wireless device reader via near field communications, wherein provisioning the electronic prepaid card information on the NFC enabled mobile device includes delivering, from the OTA provisioning server to the NFC enabled mobile device via OTA communications, personalization data that is used to generate a softcard prepaid card in the NFC enabled mobile device.

9. The system of claim 8 wherein the electronic prepaid card information comprises a prepaid card authorization code.

10. The system of claim 8 wherein the OTA provisioning server is further configured to upload the electronic prepaid card information to the NFC enabled mobile device as a prepaid softcard and personalization data.

11. The system of claim 10 wherein the personalization data is uploaded to a secure element in the NFC enabled mobile device.

12. The system of claim 8 wherein the OTA provisioning server is further adapted to send a message to the merchant server indicating the successful delivery of the electronic prepaid information to the NFC enabled mobile device.

13. The system of claim 12 wherein the merchant server is further adapted to send a confirmation message to the original purchaser of the electronic prepaid card from the merchant server indicating a successful delivery of the electronic prepaid information to the NFC enabled mobile device.

14. The system of claim 13 wherein the confirmation message includes at least one of an SMS message and an email message.

15. The system of claim 14 wherein the confirmation message includes a purchase receipt.

16. The system of claim 8 wherein the NFC enabled mobile device is adapted to transfer the personalization data to the wireless device reader in order to conduct a payment transaction.

17. A method for electronically delivering a prepaid card to a mobile device, the method comprising:
receiving, at a merchant server, purchase information related to the purchase of an electronic prepaid card, wherein the purchase information includes recipient information associated with a near field communications (NFC) enabled mobile device configured to be provisioned with the electronic prepaid card;
receiving, at an over the air (OTA) provisioning server and from the merchant server, electronic prepaid card information derived from the purchase information including the recipient information;
establishing a communications link between the OTA provisioning server and the NFC enabled mobile device associated with the recipient information, wherein establishing a communications link with the NFC enabled mobile device includes sending a control short message service (SMS) message to the NFC enabled mobile device associated with the recipient information included in the electronic prepaid card information and receiving, from the NFC enabled mobile device, an electronic prepaid card download request for the electronic prepaid card information; and
provisioning, by the OTA provisioning server, the electronic prepaid card information on the NFC enabled mobile device over the communications link via OTA communications, wherein the electronic prepaid card information is transferable from the NFC enabled mobile device to a wireless device reader via near field communications.

18. A system for electronically delivering a prepaid card to a mobile device, the system comprising:
a merchant server for receiving purchase information related to the purchase of an electronic prepaid card and generating electronic prepaid card information, wherein the purchase information includes recipient information associated with a near field communications (NFC) enabled mobile device configured to be provisioned with the electronic prepaid card; and
an over the air (OTA) provisioning server for receiving the electronic prepaid card information from the merchant server, establishing a communications link with the NFC enabled mobile device associated with the recipient information included in the prepaid card information, and provisioning the electronic prepaid card information to the NFC enabled mobile device over the communications link via over the air (OTA) communications, wherein the electronic prepaid card information is transferable from the NFC enabled mobile device to a wireless device reader via near field communications, and wherein the OTA provisioning server is further configured to send a control short message service (SMS) message to the NFC enabled mobile device associated with the recipient information included in the prepaid card information, and receive, from the NFC enabled mobile device, an electronic prepaid card download request for the electronic prepaid card information.

19. A computer readable medium having stored thereon comprising computer executable instructions that when executed by a processor of a computer performs steps comprising:

receiving, at a merchant server, purchase information related to the purchase of an electronic prepaid card, wherein the purchase information includes recipient information associated with a near field communications (NFC) enabled mobile device configured to be provisioned with the electronic prepaid card;

receiving, at an over the air (OTA) provisioning server and from the merchant server, electronic prepaid card information derived from the purchase information including the recipient information;

establishing a communications link between the OTA provisioning server and the NFC enabled mobile device associated with the recipient information; and provisioning, by the OTA provisioning server, the electronic prepaid card information on the NFC enabled mobile device over the communications link via OTA communications, wherein the electronic prepaid card information is transferable from the NFC enabled mobile device to a wireless device reader via near field communications, wherein provisioning the electronic prepaid card information on the NFC enabled mobile device includes delivering, from the OTA provisioning server to the NFC enabled mobile device via OTA communications, personalization data that is used to generate a softcard prepaid card in the NFC enabled mobile device.

* * * * *